(12) United States Patent
Kim et al.

(10) Patent No.: US 9,027,534 B2
(45) Date of Patent: May 12, 2015

(54) DUAL FUEL ENGINE AND STRATEGY TO AVOID ATMOSPHERIC VENTING

(71) Applicant: Caterpillar Inc., Peoria, IL (US)

(72) Inventors: Hoisan Kim, Dunlap, IL (US); Alan Stockner, Metamora, IL (US); Mark F. Sommars, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 392 days.

(21) Appl. No.: 13/661,461

(22) Filed: Oct. 26, 2012

(65) Prior Publication Data
US 2014/0116375 A1  May 1, 2014

(51) Int. Cl.
| F02M 21/02 | (2006.01) |
| F02B 13/00 | (2006.01) |
| F02D 19/06 | (2006.01) |
| F02D 41/00 | (2006.01) |

(52) U.S. Cl.
CPC ....... F02M 21/0278 (2013.01); F02D 19/0605 (2013.01); F02D 19/0623 (2013.01); F02D 19/0647 (2013.01); F02D 19/0694 (2013.01); F02D 41/0025 (2013.01); F02D 41/0027 (2013.01); F02M 21/0221 (2013.01); F02M 21/0239 (2013.01); Y02T 10/32 (2013.01); Y02T 10/36 (2013.01)

(58) Field of Classification Search
CPC ............ F02D 41/0025; F02D 19/0605; F02D 19/0642; F02D 19/08; F02D 19/0694; F02D 7/02; F02D 7/06; F02M 21/023

USPC ......... 123/27 GE, 525, 529, 431, 575, 198 D, 123/447, 456, 457, 458, 459, 510, 511, 514, 123/515, 299, 305
See application file for complete search history.

(56) References Cited

U.S. PATENT DOCUMENTS

| 6,543,395 B2 | 4/2003 | Green |
| 6,698,211 B2 | 3/2004 | Gustafson |
| 6,863,034 B2 | 3/2005 | Kern et al. |
| 7,019,626 B1 | 3/2006 | Funk |
| 8,037,849 B1 * | 10/2011 | Staroselsky et al. ......... 123/1 A |
| 2009/0084366 A1 * | 4/2009 | Gachik et al. ................ 123/585 |
| 2014/0081565 A1 * | 3/2014 | Pursifull ....................... 701/113 |
| 2014/0261327 A1 * | 9/2014 | Archer et al. ................ 123/446 |

FOREIGN PATENT DOCUMENTS

| DE | 10241444 | 3/2004 |
| JP | 57-168036 | 10/1982 |

* cited by examiner

Primary Examiner — Hai Huynh
(74) Attorney, Agent, or Firm — Liell & McNeil Attorneys, PC (57) ABSTRACT

A compression ignition dual fuel engine supplies natural gas fuel and liquid diesel fuel to each engine cylinder from a common fuel injector. Each fuel injector is fluidly connected to both a liquid fuel common rail and a gaseous fuel common rail. The engine includes a surplus gas system for capturing surplus gas, such as evaporated gas from the gaseous fuel supply and pressure control system, or left over pressurized natural gas produced by engine shut down. Rather than being vented to atmosphere, the surplus gas can be burned in the engine when operating conditions present burn opportunities.

20 Claims, 5 Drawing Sheets

DUAL FUEL ENGINE AND STRATEGY TO AVOID ATMOSPHERIC VENTING

TECHNICAL FIELD

The present disclosure relates generally to dual fuel engines that utilize natural gas as one of the fuels, and more particularly to a structure and strategy to avoid venting natural gas to atmosphere.

BACKGROUND

Natural gas has increasingly become an attractive alternative to other fuels for use in internal combustion engines. For instance, in one class of engines, a relatively large charge of natural gas is ignited by compression igniting a small pilot quantity of liquid diesel fuel. In one application, dual fuel compression ignition engines are utilized for powering mining trucks. The natural gas may be stored in liquid form at very cold temperatures (e.g., −160° C.) and near atmospheric pressure. As the liquefied natural gas in the storage tank absorbs heat, some of the gas evaporates off. If the evaporated gas is not used fast enough during normal engine operations, the tank can eventually build enough pressure that it needs to vent the excess evaporated gaseous fuel. Since natural gas is primarily methane, venting the natural gas to atmosphere is considered very undesirable, as methane is known as an extremely powerful greenhouse gas. In practice, liquefied natural gas tanks are often constructed to vent at around 200 PSI. In order to be commercially viable, an engine system that utilizes natural gas might need to have some strategy for limiting the amount of natural gas, and especially methane, that is vented to atmosphere.

U.S. Pat. No. 6,698,211 teaches a natural gas fuel storage and supply system for gas burning engines of a vehicle. This reference teaches a passive strategy that routes evaporated natural gas from the storage tank to the intake manifold of the engine while the engine is in operation. This reference also teaches inclusion of a restriction orifice that limits the flow rate of evaporated natural gas so that the air/gas mixture traveling through the intake manifold is sufficiently lean to avoid, or limit the risk of, combustion of the air/gas mixture in the intake manifold. This reference also teaches that a flow control valve may be substituted in place of the restricting orifice. Although this reference recognizes a desirability to burn rather than vent evaporated natural gas from a storage tank, it fails to contemplate other problems that could arise in such systems, especially dual fuel compression ignition engine systems.

Dual fuel engines that utilize natural gas typically have some volume of pressurized natural gas available at all times during normal engine operation. At time of engine shut down, disposing of an existing surplus volume of pressurized gas can potentially be a concern.

The present disclosure is directed toward one or more of the problems set forth above.

SUMMARY

In one aspect, a compression ignition dual fuel engine includes a gaseous fuel common rail fluidly connected to a plurality of fuel injectors that are each positioned for direct injection into one engine cylinder. A liquid fuel common rail is fluidly connected to the plurality of fuel injectors. A gaseous fuel supply and pressure control system is fluidly connected to the gaseous fuel common rail, and a liquid fuel supply and pressure control system is fluidly connected to the liquid fuel common rail. A surplus gas system includes an accumulator fluidly positioned between an electronically controlled supply valve and the gaseous fuel supply and pressure control system. A pressure reduction valve has a first configuration that fluidly connects the gaseous fuel common rail to the surplus gas system, and a second configuration that fluidly blocks the gaseous fuel common rail to the surplus gas system. Each of the fuel injectors has a liquid drain outlet fluidly connected to the liquid fuel supply and pressure control system. An electronic controller is in control communication with each of the plurality of fuel injectors, the liquid fuel supply and pressure control system, the gaseous fuel supply and pressure control system, the pressure reduction valve and the electronically controlled supply valve.

In another aspect, a dual fuel common rail system includes a gaseous fuel common rail and a liquid fuel common rail fluidly connected to a plurality of fuel injectors. A gaseous fuel supply and pressure control system is fluidly connected to the gaseous fuel common rail, and a liquid fuel supply and pressure control system is fluidly connected to the liquid fuel common rail. A surplus gas system includes an accumulator fluidly positioned between an electronically controlled supply valve and the gaseous fuel supply and pressure control system. A pressure reduction valve is fluidly positioned between the gaseous fuel common rail and the surplus gas system. The dual fuel common rail system has a gas pressure reduction configuration in which the pressure reduction valve is open to fluidly connect the gaseous fuel common rail to the surplus gas system to reduce pressure in the gaseous fuel common rail. The dual fuel common rail system has a gas burn off configuration in which the electronically controlled supply valve is open. Finally, the dual fuel common rail system has a shut down configuration in which both the pressure reduction valve and the electronically controlled supply valve are closed.

In another aspect, a machine includes a machine body supported on a conveyance. A compression ignition dual fuel engine is attached to the machine body and includes a gaseous fuel common rail fluidly connected to a plurality of fuel injectors that are each positioned for direct injection into one engine cylinder. A liquid fuel common rail is fluidly connected to the plurality of fuel injectors. A gaseous fuel supply and pressure control system is fluidly connected to the gaseous fuel common rail, and a liquid fuel supply of pressure control system is fluidly connected to the liquid fuel common rail. A surplus gas system includes an accumulator fluidly positioned between an electronically controlled supply valve and the gaseous fuel supply and pressure control system. A pressure reduction valve has a first configuration that fluidly connects the gaseous fuel common rail to the surplus gas system, and a second configuration that fluidly blocks the gaseous fuel common rail to the surplus gas system. Each of the fuel injectors has a liquid drain outlet fluidly connected to the liquid fuel supply and pressure control system. An electronic controller is in control communication with each of the plurality of fuel injectors, the liquid fuel supply and pressure control system, the gaseous fuel supply and pressure control system, the pressure reduction valve and the electronically controlled supply valve.

In still another aspect, a method of operating a dual fuel compression ignition engine includes reducing fueling of gaseous fuel to the engine. The gaseous fuel common rail pressure is reduced responsive to the step of reducing fueling of gaseous fuel to the engine. The step of reducing gas pressure includes opening a pressure reduction valve and moving gaseous fuel from the gaseous fuel common rail to the accumulator of the surplus gas system without venting gaseous fuel to atmosphere. After the pressure is reduced, the pressure reduction valve is closed.

DETAILED DESCRIPTION

Figure 1:
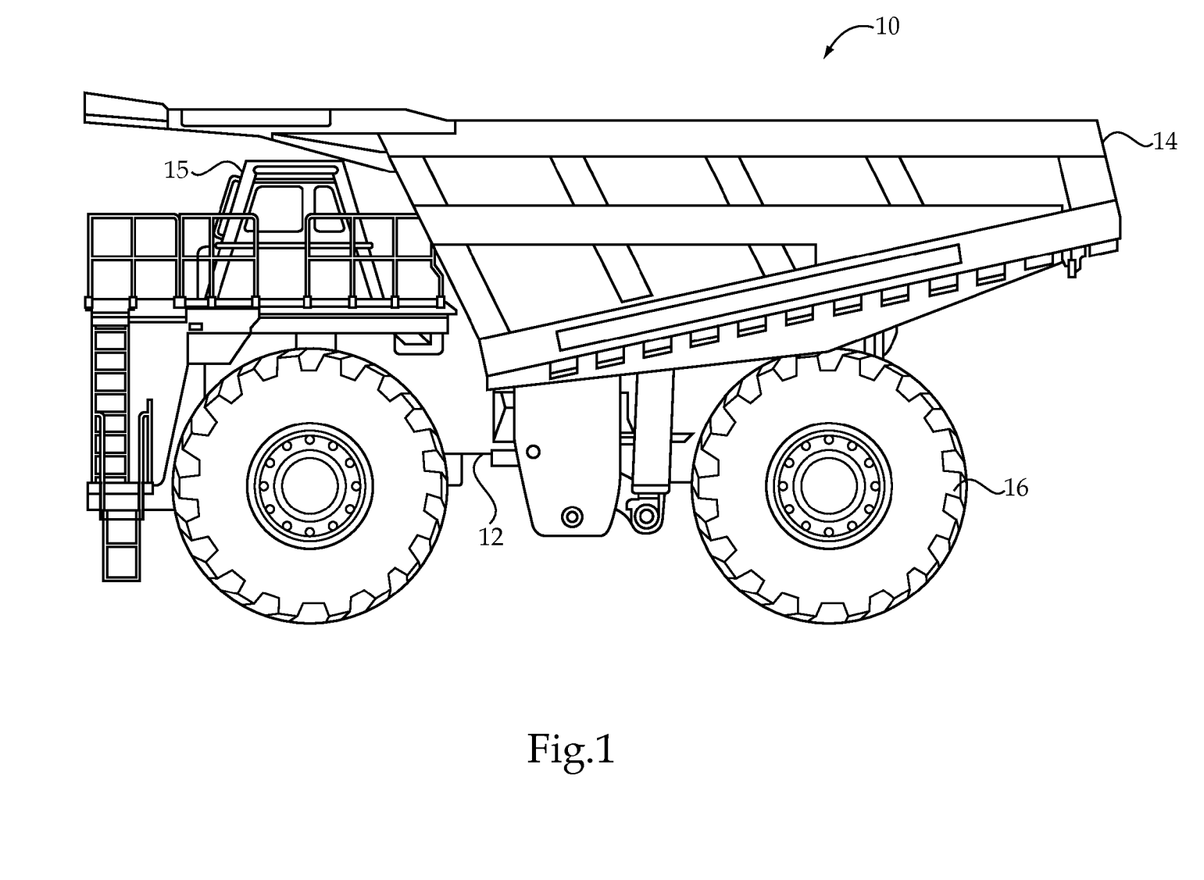
FIG. 1 is a side view of a machine according to one aspect of the present disclosure.

Referring initially to FIG. 1, a machine 10 includes a machine body 12 supported on a conveyance 16. In the illustrated embodiment, machine 10 is shown as a mining truck, and conveyance 16 is shown as wheels. However, machine 10 could take a wide variety of forms, and conveyance 16 could also vary substantially. For instance, conveyance 16 could be tracks or possibly even a propeller in the case of a machine in the form of a seagoing vessel. Mining truck 10 includes a dump body 14 pivotally attached to machine body 12, and also an operator station 15. One could expect a duty cycle for mining truck 10 to include time periods of idling without movement when mining truck 10 is waiting to receive a load, such as ore, in dump body 14, waiting to dump a load, and maybe even waiting to be refueled. Between these motionless idling periods, one might expect mining truck 10 to be operating at full power carrying a heavy load in dump body 14 up a steep grade at a mining site. During motionless idling, the engine powering machine 10 might consume only miniscule amounts of fuel. On the otherhand, when operating at full power carrying a heavy load up a steep grade, one might expect mining truck 10 to consume relatively large quantities of fuel.

Figure 2:
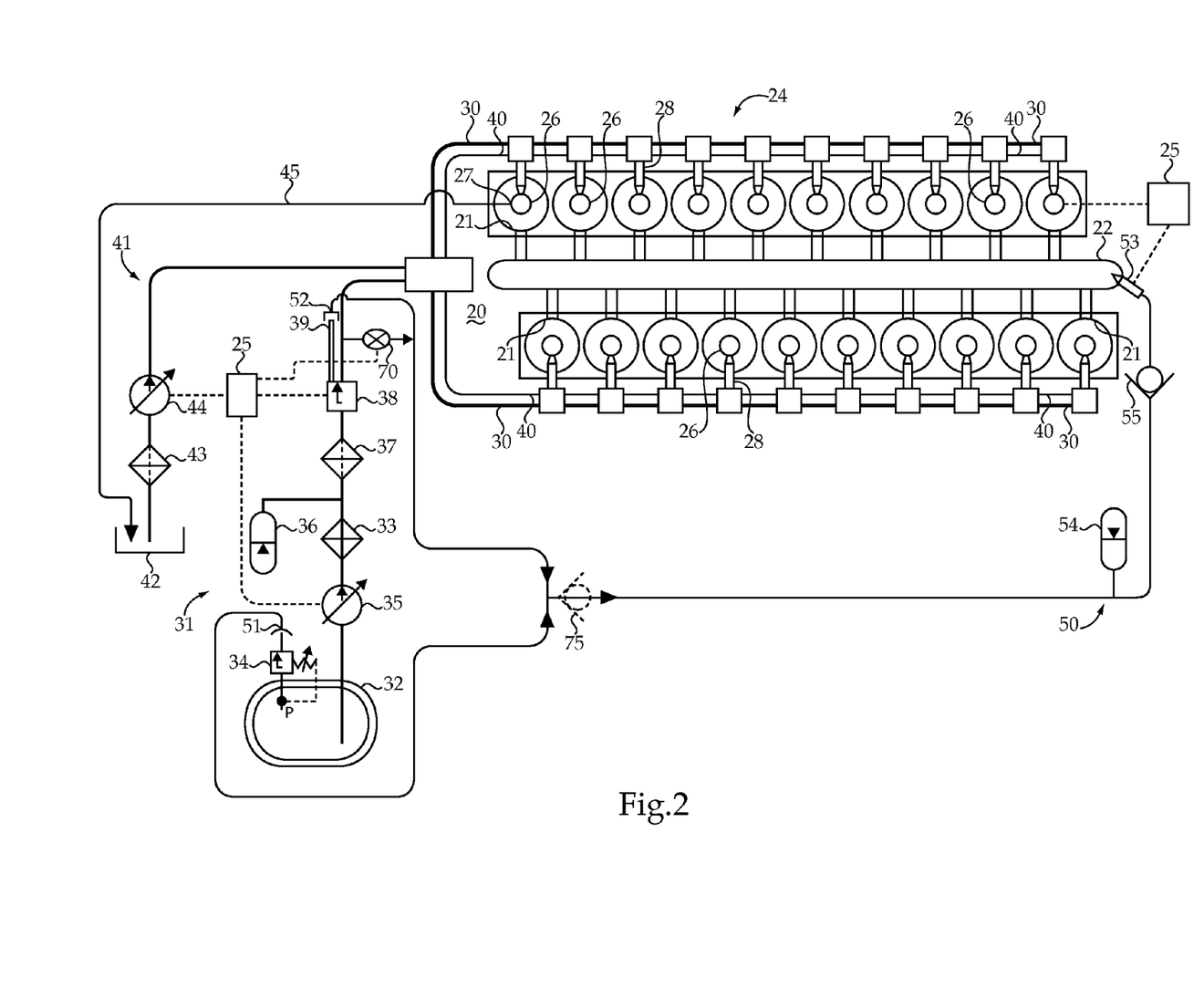
FIG. 2 is a schematic view of a dual fuel compression ignition engine for the machine of FIG. 1.

Referring in addition to FIG. 2, machine 10 may be powered by a compression ignition dual fuel engine 20 that includes a intake manifold 22 fluidly connected to a plurality engine cylinders 21. Compression ignition dual fuel engine 20 may be supported on machine body 12 and operably coupled to conveyance 16 in a known manner. For instance, engine 20 could be mechanically coupled to conveyance 16, or might even be coupled via an intervening electrical generator that supplies electrical power to motors that directly drive conveyance 16. In any event, direct or indirect coupling between engine 20 and conveyance 16 all fall within the intended scope of the present disclosure. In other words, if engine 20 must combust fuel in order to move machine 10 via conveyance 16, then engine 20 can be considered to be operably coupled to conveyance 16 according to the present disclosure. In the illustrated embodiment, engine 20 includes twenty engine cylinders 21, but engines with any numbers of cylinders would also fall within the intended scope of the present disclosure.

Engine 20 includes dual fuel common rail system 24 with a gaseous fuel common rail 30 fluidly connected to a plurality of fuel injectors 26 that are each positioned for direct injection into one engine cylinder 21. A liquid fuel common rail 40 is also fluidly connected to the plurality of fuel injectors 26. The fluid connection between the respective common rails 30, 40 and fuel injectors 26 may be accomplished in a number of ways, such as by utilizing co-axial quill assemblies 28. Use of separate injectors for each fuel would also fall within the scope of this disclosure. A gaseous fuel supply and pressure control system 31 is fluidly connected to the gaseous fuel common rail 30. A liquid fuel supply and pressure control system 41 is fluidly connected to the liquid fuel common rail 40. A surplus gas system 50 is fluidly positioned between an electronically controlled supply valve 53 that is fluidly connected to the intake manifold 22, and the gaseous fuel supply and pressure control system 31. The electronically controlled supply valve 53 is movable between an open position and a closed position. However, those skilled in the art will appreciate that the electronically controlled supply valve 53 may include a variety of features without departing from the present disclosure, such as, but not limited to an orifice, a variable flow rate capability, and maybe even some conventional device for pressure regulation. Each of the fuel injectors 26 includes a liquid drain outlet 27 fluidly connected to the liquid fuel supply and pressure control system 41 via a drain return line 45. In order to avoid too many overlapping fluid connections, drain return line 45 is shown only connected to one fuel injector 26, but is actually fluidly connected to the liquid drain outlet 27 of all twenty fuel injectors 26. This feature reflects the fact that the liquid fuel, which may comprise liquid diesel, may be utilized not only as an injection medium, but also as a control fluid which is returned for recirculation from the liquid drain outlet 27. An electronic controller 25 is in control communication with each of the plurality of fuel injectors 26, the liquid fuel supply and pressure control system 41, the gaseous fuel supply and pressure control system 31 and the electronically controlled supply valve 53.

The liquid fuel supply and pressure control system 41 may include a low pressure tank 42 containing liquid diesel fuel, a filter 43 and a high pressure pump 44 that supplies liquid fuel to, and controls pressure in, liquid fuel common rail 40. High pressure pump 44 may be a variable output pump comprising one of several different types of structures known in the art including but not limited to inlet metered, variable displacement, spill valve controlled or any type of pump that is electronically controlled to vary the output from the pump 44 to control pressure in the liquid fuel common rail 40 in a manner well known in the art.

The gaseous fuel supply and pressure control system may include a cryogenic tank 32, a variable displacement pump 35, a heat exchanger 33, an accumulator 36, a filter 37 and a fuel conditioning module 38. Variable displacement pump 35 and fuel conditioning module 38 may be in control communication with electronic controller 35 in order to supply gaseous fuel to, and control pressure in, the gaseous fuel common rail 30. Cryogenic tank 32 may contain a supply of chilled liquefied natural gas. A pressure relief valve 34 may be part of cryogenic tank 32, and a vent 39 may be a portion of fuel conditioning module 38.

The surplus gas system 50 includes an accumulator 54 with a capacity or volume that may be greater than the gaseous fuel common rail 30. Surplus gas system 50 may also include a check valve 55 that can be utilized to prevent backflow of air from intake manifold 22, such as what might occur if electronically controlled supply valve 53 is open when pressure in intake manifold 22 exceeds the pressure in surplus gas system 50. The pressure relief valve 34 of cryogenic tank 32 may be fluidly connected to a first inlet 51 of the surplus gas system 50, and the vent 39 of fuel conditioning module 38 may be fluidly connected to a second inlet 52 of surplus gas system

50. It is this aspect of the disclosure that allows capture of evaporated natural gas from cryogenic tank when conditions cause pressure in the tank to exceed the valve opening pressure of the pressure relief valve 34, and also capture evaporated gas at vent 39 from fuel conditioning module 38 that might have otherwise been vented to atmosphere. The surplus gas system 50 is generally positioned between the electronically controlled supply valve 53 and the gaseous fuel supply of pressure control system 31. An isolation valve 75 in the form of a check valve may be included to prevent back flow of gaseous fuel from accumulator 54 toward the gaseous fuel supply and pressure control system 31. A pressure reduction valve 70 has a first configuration that fluidly connects the gaseous fuel common rail 30 to the surplus gas system 50, and a second configuration that fluidly blocks the gaseous fuel common rail 30 to the surplus gas system 50. Electronic controller 25 is also in control communication with pressure reduction valve 70.

In addition to capturing evaporated gas from the gaseous fuel supply and pressure control system 31, surplus gas system 50 may also receive gas from gaseous fuel common rail 30 via pressure reduction valve 70. During a vast majority of the time when engine 20 is operating and/or shut down, the pressure reduction valve 70 may be in a closed configuration that fluidly blocks the gaseous fuel common rail 30 to the surplus gas system 50. However, when there is a desire to quickly reduce pressure in gaseous fuel common rail 30, pressure reduction valve 70 may be briefly opened to move a quantity of gaseous fuel from gaseous fuel common rail 30 for potential storage in accumulator 54. A circumstance during which pressure reduction valve 70 might be opened could include when there is a desire to reduce pressure in the gaseous fuel rail 30, which might occur when engine 20 is dropped from full load to a low load or idle condition. Those skilled in the art will appreciate that reliance upon gaseous fuel injection events to lower pressure in the gaseous fuel common rail 30 could take an unacceptable amount of time. This is to be contrasted with the fact that pressure in the liquid fuel common rail 40 can be reduced quickly with one or more small injection events because liquid diesel fuel is nearly incompressible. In another circumstance, the pressure reduction valve 70 may also be opened to receive pressurized gas from gaseous fuel common rail 30 at a time of engine shut down. There may also be reason to maintain gaseous fuel pressure below liquid fuel pressure when engine fueling is abruptly stopped during an over speed condition. Electronic controller 25 may include a gas venting avoidance algorithm 80 (FIG. 5 discussed infra) configured to communicate open and closed signals to pressure reduction valve 70. As used in this disclosure, communicating a closed signal may simply comprise the absence of communication of an open signal, and vice versa.

The present disclosure contemplates the use of both accumulator 54 and the electronically controlled supply valve 53 to store surplus gas when conditions are less favorable for channeling the surplus gas into intake manifold 22, and also dose surplus gas into intake manifold 22 when conditions are more favorable. Among the considerations that could be utilized in determining when conditions are favorable might include, but is not limited to, deciding if combustion conditions in engine 20 have an elevated risk of methane slip, which would be unfavorable, or a reduced risk of methane slip, which would be considered a favorable condition. For instance, one might consider engine 20 operating at a high load condition as representing a higher risk of methane slip since a relatively large charge of natural gas will be ignited by compression igniting a small pilot quantity of diesel fuel. For reasons beyond the scope of the present disclosure, one might expect larger quantities of unburned natural gas to escape from engine cylinders 21 when operating in high load conditions. Methane slip is a risk because the unburned natural gas may largely comprise methane. Lower risk of methane slip might correspond to combustion conditions associated with low load or idling, when all or almost all of the fuel in the respective engine cylinders 21 is combusted, with little or no unburned fuel escaping from the respective engine cylinders 21. Another consideration in determining whether conditions are favorable to open the electronically controlled supply valve 53 to dose surplus gas into intake manifold 22 might include whether the mixture of air and fuel in the intake manifold reaches a ratio that risks early and undesirable ignition of the mixture in the intake manifold. Thus, one might expect electronic controller 25 to monitor the air fuel ratio in intake manifold 22, such as by monitoring the flow rate through electronically controlled supply valve 53 and the boost pressure supplying air to intake manifold 22 in a conventional manner to ensure that the mixture is sufficiently lean to present a low risk of ignition. Another consideration might be simply to avoid opening electronically controlled supply valve 53 when pressure in intake manifold 22 exceeds the pressure in surplus gas system 50. These and other considerations might be continuously taken into account by electronic controller 25 by including a surplus gas dosing algorithm 60 (FIG. 4) that is configured to communicate an open signal and a closed signal to the electronically controlled supply valve 53.

Figure 3:
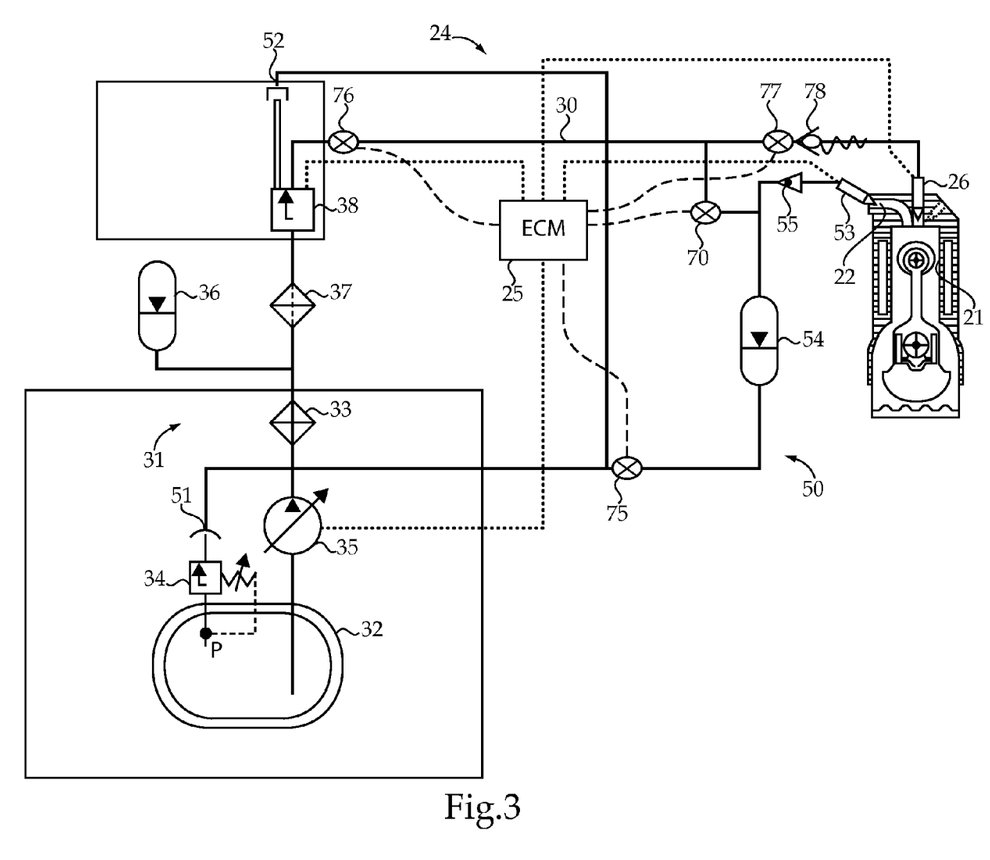
FIG. 3 is a schematic view of a gas portion of a dual fuel compression ignition engine according to another aspect of the present disclosure.

Referring now to FIG. 3, the gas portion of dual fuel common rail system 24 according to another aspect of the disclosure is depicted to show only one engine cylinder 21, whereas FIG. 2 shows all 20 engine cylinders. In addition, FIG. 3 depicts additional isolation valves 75, 76 and 77 that are not shown in FIG. 2. These valves may normally be open during engine run conditions, but may be closed at engine shut down to trap pressurized gas in surplus gas system 50 and/or gaseous fuel common rail 30 for burning in the engine during a subsequent engine run cycle. Isolation valve 75 may comprise a simple check valve (FIG. 2), or could be an electronically controlled valve (FIG. 3) in control communication with electronic controller 25 without departing from the present disclosure. Isolation valve 75 may be fluidly positioned on an opposite side of accumulator 54 from electronically controlled supply valve 53. Although FIG. 3 shows a single check valve 75 where the flow streams from inlets 51 and 52 merge, isolation valve 75 could comprise two separate valves located at positions closer to inlets 51 and 52. When dual fuel common rail system 24 is in a shut down configuration, both the pressure reduction valve 70 and the electronically controlled supply valve 53 may be closed along with isolation valve 75 to trap gas in surplus gas system 50 for later burning in engine 20 in a subsequent engine run cycle. In addition to, or as an alternative to the inclusion of isolation valve 75, fuel system 24 may include a first rail isolation valve 76 fluidly positioned between the gaseous fuel common rail 30 and the gaseous fuel supply and pressure control system 31. A plurality of second rail isolation valves 77 may each be fluidly position between the gaseous fuel common rail 30 and one of the plurality of fuel injectors 26. During engine run conditions, isolations valves 76 and 77 would normally be opened. However, at time of engine shut down, isolation valves 76 and 77 could be closed to trap residual pressurized gaseous fuel in gaseous fuel common rail 30 for burning in a subsequent engine run cycle.

Dual fuel common rail system 24 can be thought of as having a number of different configurations. For instance, a normal operation configuration could include engine 20 operating over a broad range of speeds and loads while burning natural gas that is ignited by compression igniting a small pilot injection quantity of liquid diesel fuel. During the normal operation configuration, isolation valves 76 and 77, if included, would be maintained open while the isolation valve 75 could be open or closed, depending upon whether surplus gas was then being moved out of gaseous fuel supply and pressure control system 31. Likewise, during a normal operation configuration the electronically controlled supply valve 53 could be opened or closed depending upon whether there was surplus gas needing to be burned and whether engine 20 was being operated in a manner favorable to burning the surplus gas as discussed earlier. During the normal operation configuration, one could also expect the pressure reduction valve 70 to be maintained in a closed position.

The dual fuel common rail system 24 may also have a gas pressure reduction configuration in which the pressure reduction valve 70 is opened to fluidly connect the gaseous fuel common rail 30 to the surplus gas system 50 to reduce pressure in the gaseous fuel common rail 30. For instance, the gas pressure reduction configuration may correspond to when engine 20 abruptly drops from a relatively high load or speed operating condition to a low load or possible idling condition, and this change is accompanied by a desire to rapidly decrease pressure in gaseous fuel common rail 30. The dual fuel common rail system 24 may also have a gas burn off configuration in which the electronically controlled supply valve 53 is open to move surplus gas from accumulator 54 into the intake manifold 22 of engine 20. Finally, the dual fuel common rail system 24 may also have a shut down configuration in which both the pressure reduction valve 70 and the electronically controlled supply valve 53 are closed to trap surplus gas in surplus gas system 50 for burning in a subsequent engine run cycle. If included, isolation valve 75 as well as isolation valve 76 and 77 may also be closed when the dual fuel common rail system 24 is in the shut down configuration. Again, if included, isolation valves 76 and 77 may be opened in each of the normal operation configuration and the gas pressure reduction configuration. Depending upon a desired shut down strategy, isolation valve 75 may be periodically opened to receive evaporated gas from gas supply and pressure control system 31 when engine 20 is shut down. Other strategies may maintain isolation valve 75 closed at all times during engine shut down.

Figure 4:
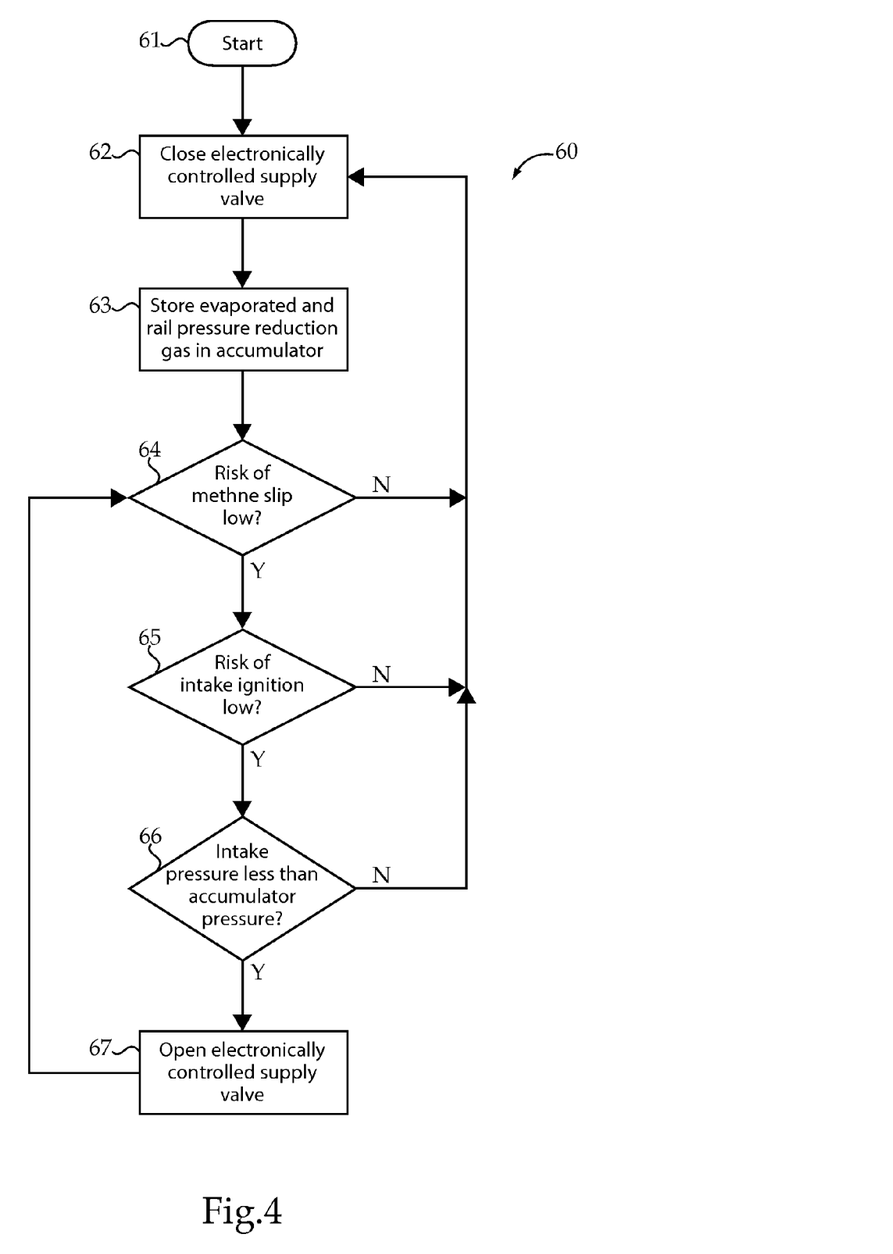
FIG. 4 is a logic flow diagram for a surplus gas dosing algorithm according to another aspect of the present disclosure.

Referring in addition to FIG. 4, a logic flow diagram for one surplus gas dosing algorithm 60 according to one example strategy is shown. The logic begins at start 61 and proceeds to block 62 where the electronically controlled gas supply valve 53 is closed. The closure of gas supply valve 53 may be accomplished simply by ceasing transmission of an open signal and relying upon some mechanical bias to normally maintain electronically controlled supply valve 53 in a closed position. Thus, a closed signal in the context of the present disclosure might simply mean the absence of an open signal, which may comprise electrical energy to actuate an electrical actuator to move the electronically controlled supply valve 53 from a biased closed position toward an open position in a manner associated with many valves known in the art. At block 63, surplus gas is stored in accumulator 54. Thus, evaporated gas from either cryogenic tank 32 or fuel conditioning module 38 may enter surplus gas system 50 and be stored in accumulator 54 whenever engine 20 is operating, and maybe even when engine 20 is not running. Next, at query 64, the logic determines whether the risk of methane slip is low. Depending upon the particular engine, engineers can easily determine what combustion load conditions correspond to when all or almost all of the fuel in the individual cylinders 21 can be expected to be combusted. Thus, implementation of query 64 may simply be based upon electronic controller 25 deciding whether or not the engine load condition is above some threshold. In general, one could expect the risk of methane slip to be low during low load and idle conditions. Depending upon the particular application, the logic may simply determine that the risk of methane slip is low only when machine 10 is idling according to one embodiment of the present disclosure. If the surplus gas dosing algorithm 60 determines that the risk of methane slip is not low, the logic returns to block 62 to maintain the electronically controlled gas supply valve 53 closed. On the other hand, if it is determined that the risk of methane slip is low, the logic will advance to query 65 where it is determined whether the risk of intake ignition is low. As discussed earlier, this might be accomplished by electronic controller 25 monitoring the air fuel ratio in intake manifold 22. For instance, depending upon the particular engine, the risk of intake ignition could be considered to be low when the air fuel ratio in intake manifold 22 is below some predetermined percentage. If, for whatever reason, the air fuel ratio in the intake manifold 22 exceeded this threshold, the logic would return to block 62 and maintain or move the electronically controlled gas supply valve 53 to a closed condition. On the other hand, if the air fuel ratio and intake manifold 22 is below that predetermined threshold demonstrating a low risk of intake ignition, the logic might advance to query 66 where electronic controller 25 would determine whether the pressure in intake manifold 22 was less than the pressure in accumulator 54. If this condition is satisfied, the logic would advance to block 63 and open the gas supply valve 53 to dose a quantity of surplus gas into intake manifold 22. However, if the pressure in intake manifold 22 is greater than the pressure in surplus gas system 50, the logic would loop back to block 62 and command closure or maintain closure of electronically controlled gas supply valve 53.

Figure 5:
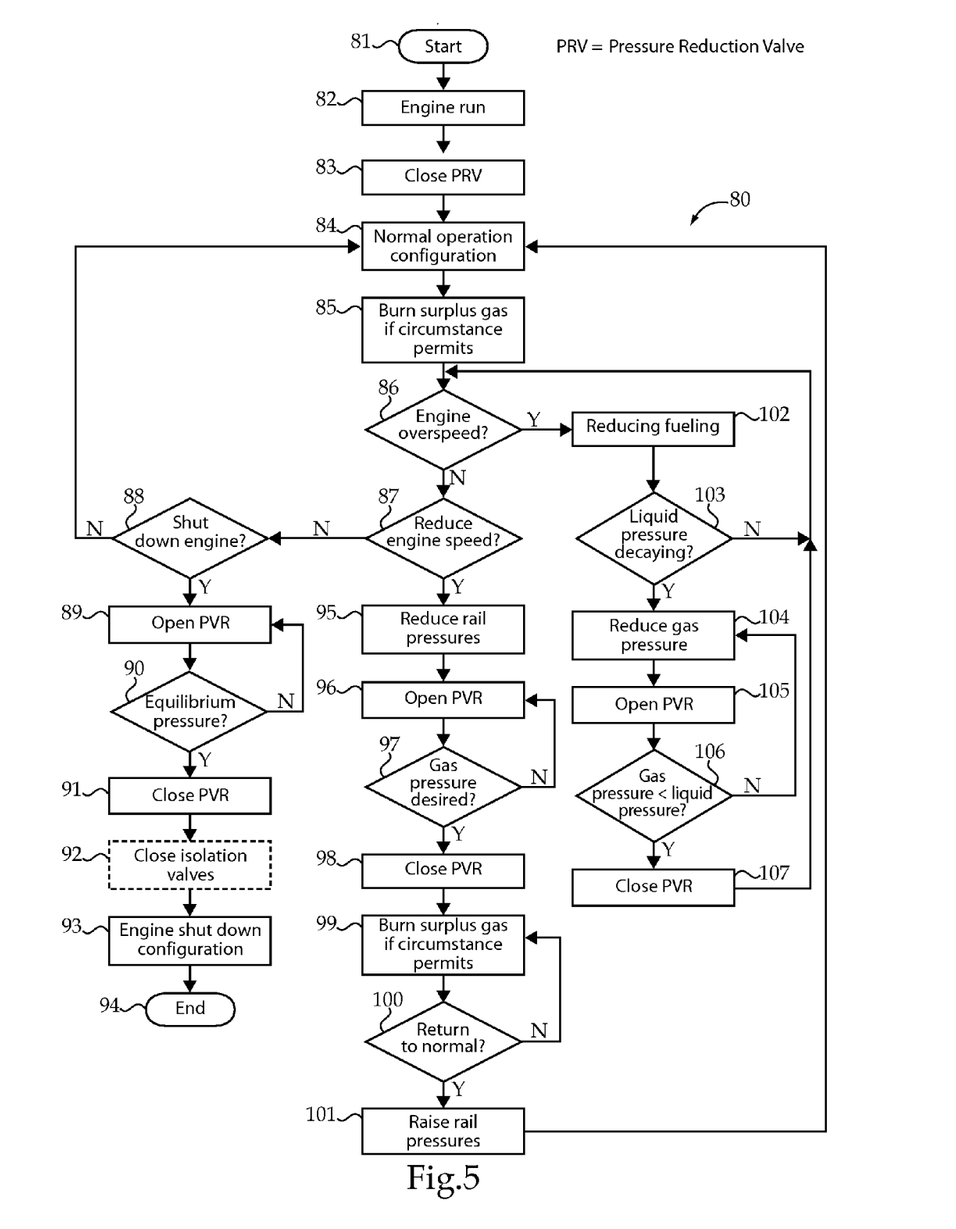
FIG. 5 is a logic flow diagram for a gas venting avoidance algorithm according to the present disclosure.

In addition to a surplus gas dosing algorithm 60, electronic controller 25 might also be equipped with a gas venting avoidance algorithm 80 configured to communicate open and closed signals to pressure reduction valve 70 responsive to a variety of different conditions. For instance, the gas venting avoidance algorithm 80 may be configured to communicate an open signal to pressure reduction valve 70 responsive to a reduction in desired gas pressure in gaseous fuel common rail 30. On the other hand, the gas venting avoidance algorithm 80 may be configured to communicate a close signal to pressure reduction valve 70 responsive to gas rail pressure being reduced to the desired gas rail pressure during an engine run signal. In addition, the gas venting avoidance algorithm 80 may be configured to communicate a closed signal to the pressure reduction valve 70 responsive to an engine shut down signal and the gas rail pressure in gaseous fuel common rail 30 approaching equilibrium with pressure in accumulator 54. During normal engine operating conditions, in one example embodiment, desired gas pressure in gaseous fuel common rail 30 may range from about 20 MPa up to maybe about 35 MPa. Surplus gas system 50 may be configured to operate in a range up to about 1-2 MPa, for example.

Referring specifically to FIG. 5, one example gas venting avoidance algorithm logic flow diagram according to the present disclosure is illustrated. The logic begins at start 81 and proceeds to block 82 where an engine run signal is generated corresponding to engine 20 operating. Next at block 83, the pressure reduction valve 70 is closed. At block 84, dual fuel common rail system 24 is in a normal operation configuration. At block 85, surplus gas from surplus gas system 50 may be burned, such as by executing surplus gas dosing algorithm 60 is described earlier to open electronically controlled supply valve 53 if circumstances are appropriate. Next, at query 86, the logic determines whether engine 20 is in an over speed condition. If yes, the logic proceeds to block 102 where the fueling to engine 20 is reduced or maybe even stopped. At query 103, the logic determines whether liquid pressure in liquid fuel common rail 40 is decaying. If not, the logic returns to re-execute the query 86 regarding engine over speed. If liquid pressure in liquid fuel common rail is decaying, the logic advances to block 104 to reduce gas pressure in gaseous fuel common rail 30. This is done by opening the pressure reduction valve 70 at block 105 in order to maintain gaseous fuel pressure in common rail system 24 lower than the liquid fuel than the prevailing liquid fuel pressure to inhibit migration of gaseous fuel into the liquid side of common rail system 24. At query 106, the logic determines whether the gas pressure is lower than the liquid pressure. If not, the logic loops back to block 104 to continue reducing gas pressure. If query 106 returns an affirmative, meaning that the gas pressure is less than the liquid pressure during an over speed condition, the pressure reduction valve 70 is closed at block 107. Thereafter, the logic loops back to repeat the engine over speed query 86. If the engine over speed query returns a negative response, the logic advances to query 87 to determine whether there has been a substantial reduction in engine speed. For instance, query 87 may be related to determining whether the engine 20 has suddenly dropped from a high load condition back to an idle condition, such as what might occur when machine 10 stops movement while climbing out of a mine site with a heavy load. At block 95, the logic reduces both the liquid and gas pressures in common rails 30 and 40. Although the liquid fuel common rail 40 can be expected to quickly decay pressure, the logic will open the pressure reduction valve 70 at block 96 to reduce gas pressure to some lower desired gas pressure. At query 97, the logic determines whether the gas pressure has reduced to the new lower desired gas pressure. If not, the logic looks back to maintain the pressure reduction valve 70 open at block 96. If the gas pressure in rail 30 has reduced to a new lower desired gas rail pressure, the logic closes the pressure reduction valve 70 at block 98. The engine 20 might then be operating in a low load or idling condition and the logic at block 99 may again execute the surplus gas dosing algorithm 60 at block 99 to determine if circumstances are appropriate for burning surplus gas by opening electronically controlled supply valve 53. Next, the logic queries whether there is a return to a normal operating configuration at query 100, such as what might occur if the machine 10 again needs to start moving after being stopped in a idled configuration. If there is a return to normal operating configuration, the logic may raise both the liquid and gaseous rail pressures at block 101 before returning to block 84 corresponding to a normal operation configuration. Returning to query 87, if a negative response is returned the logic will advance to query 88 to determine whether the engine is being shut down. If not, the logic loops back again to block 84 corresponding to a normal operation configuration. On the other hand, if the logic determines that the engine is being shut down, the logic at block 89 will open the pressure reduction valve 70 to move gaseous fuel from gaseous fuel common rail 30 into accumulator 54 of surplus gas system 50. At query 90, the logic determines whether the gaseous fuel common rail 30 and the surplus gas system 50 have reached an equilibrium pressure. If not, the logic loops back to block 89 to maintain the pressure reduction valve 70 opened. If equilibrium pressure has been achieved, the logic advances to block 91 to close the pressure reduction valve 70.

Next, if isolation valves 75 or 76 and 77 are present, the logic would close those isolation valves at block 92. Next, at block 93, the engine enters a shut down configuration. The logic ends at oval 94.

Those skilled in the art will appreciate that there could be many ways of establishing a logic for opening and closing the pressure reduction valve 70 that could differ substantially from the gas venting avoidance algorithm 80 shown in FIG. 5. Overall, the present disclosure seeks to utilize the surplus gas system 50 and the pressure reduction valve 70 to capture both the evaporated gas and surplus gas to reduce circumstances that might otherwise require venting gaseous fuel to atmosphere, and instead burning that surplus gas when the engine 20 is running and circumstances are favorable. Apart from capturing and burning the evaporated gas from the gaseous fuel supply and pressure control system 31, the present disclosure also teaches the exploitation of the surplus gas system 50 to quickly reduce gas pressure in gaseous fuel common rail 30. For instance, reducing pressure in the gaseous fuel common rail 30 may be responsive to reducing fueling of gaseous fuel to engine 20. Reducing fueling to engine 20 may be done responsive to an engine over speed condition, responsive to a substantial reduction in engine speed or load, and may be even as part of shutting down engine 20. When reducing pressure in gaseous fuel common rail 30, the present disclosure teaches accomplishing this task by opening the pressure reduction valve 70 and moving gaseous fuel from the gaseous fuel common rail 30 to the accumulator 54 of the surplus gas system 50 without venting gaseous fuel to atmosphere. After the pressure in gaseous fuel common rail 30 is sufficiently reduced, the pressure reduction valve 70 is closed.

INDUSTRIAL APPLICABILITY

The present disclosure finds general applicability to any engine that burns gaseous fuel supplied from a gaseous fuel common rail. The present disclosure finds general applicability to such engines where there is a desire to avoid venting the potentially harmful greenhouse gas methane to atmosphere. The present disclosure finds particular applicability to dual fuel engines that combust liquid diesel fuel and natural gas fuel. Finally, the present disclosure finds specific applicability when a dual fuel compression ignition engine is used to power a machine, such as a mining truck.

When in operation, one could expect engine 20 to compression ignite a relatively small quantity of liquid diesel fuel to in turn ignite a much larger charge of natural gas. At relatively low loads and maybe at idle, engine 20 may combust a higher ratio of diesel fuel to natural gas fuel than the ratio that could be associated at higher loads. In fact, during idle conditions engine 20 may utilize no gas from gaseous fuel common rail 30 to maintain operation of engine 20. However, those skilled in the art will appreciate that the fueling ratio conditions are somewhat a matter of design choice and could vary substantially from one engine to another without departing from the present disclosure. In any event, when conditions are satisfied and surplus gas is dosed into the intake manifold 22, the quantities of surplus gas that are combusted may or may not be sufficient to effect the fueling logic associated with injection of either liquid diesel or natural gas from the individual fuel injectors 26. In other words, the heat release contribution of burning the surplus gas from the surplus gas system 50 might be so low as to not significantly contribute to the heat release of liquid diesel and/or injected gas at a given engine operating condition. On the other hand, if the heat release is significant, one might expect the engine governor to decrease one of liquid diesel or more likely injected natural gas, to compensate for the additional fuel provided by the surplus gas system 50 in order to maintain engine speed at the governed state.

When in operation, electronically controlled supply valve 53 maybe opened for combusting a mixture of evaporated gas from the intake manifold 22 and injected gas from the fuel injector 26 by compression igniting diesel from the fuel injector 26 in a plurality of engine cylinders 21 during a first engine cycle. In addition, one could expect the electronically controlled supply valve 53 to be closed and the engine 20 combust exclusively injected gas from the fuel injector 26 by compression igniting diesel fuel from fuel injector 26 in the plurality of engine cylinders 21 during a second and different engine cycle. Those skilled in the art will appreciate that an engine cycle according to the present disclosure includes an intake stroke, a compression stroke, an expansion stroke and an exhaust stroke. As discussed earlier, closure of the electronically controlled supply valve 53 may be performed when combustion conditions correspond to an elevated risk of methane slip, whereas opening of the electronically controlled supply valve 53 may be performed when combustion conditions correspond to a reduced risk of methane slip. Those skilled in the art will recognize that the term "methane slip" refers to escape of unburned methane from an exhaust pipe associated with engine 20. During normal operating conditions as engine 20 moves between idling and loaded conditions, one could expect surplus gas to be stored in accumulator 54. When electronically controlled supply valve 53 is opened, some of the stored surplus gas would naturally be removed from accumulator 54 for dosing into intake manifold 22. Also during normal operation, one could expect surplus gas from the fuel conditioning module 38 and maybe evaporated gas from cryogenic tank 32 to be moved to accumulator 54. In addition to closing electronically controlled supply valve 53 contingent upon combustion conditions corresponding to an elevated risk of methane slip, supply valve 53 may also be closed contingent on an air/fuel ratio in the intake manifold 22 corresponding to an elevated risk of intake ignition. In addition, the present disclosure contemplates that the specific air/fuel ratio associated with an elevated risk of intake ignition might also vary both with engine operating conditions and with atmospheric conditions. For instance, an elevated risk of intake ignition may correspond to one air fuel ratio at low altitudes, but a different air/fuel ratio at higher altitudes. Other conditions known in the art could also contribute to a variable air/fuel ratio associated with an elevated risk of intake ignition.

As discussed earlier, closure of the electronic controlled supply valve 53 is performed responsive to a closed signal communicated from the electronic controller 25 to the supply valve 53. Depending upon the structure of electronically controlled supply valve 53, the close signal might simply be nothing or the absence of an open signal, or the actuator associated with electronically controlled supply valve 53 could require some active signal, such as if electronically controlled supply valve 53 were biased toward an open condition. Likewise, opening of the electronically controlled supply valve 53 is performed responsive to an open signal communicated from the electronic controller to the supply valve. As with the closed signal, the open signal could, depending upon the structure and actuator associated with electronically controlled supply valve 53 may simply consist of the absence of a closed signal, or may comprise some positive energy being supplied to an actuator of electronically controlled supply valve 53 to open the same.

The present disclosure teaches a way of operating an engine that utilizes natural gas with a strategy of avoiding venting excess natural gas to atmosphere to avoid releasing the potentially harmful greenhouse gas methane. Instead of venting the excess or evaporated gas to atmosphere, the present disclosure teaches burning of that evaporated gas in engine 20 when various contingent conditions are satisfied according to an evaporated gas dosing algorithm 60.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A compression ignition dual fuel engine comprising:
a gaseous fuel common rail fluidly connected to a plurality of fuel injectors each positioned for direct injection into one engine cylinder;
a liquid fuel common rail fluidly connected to the plurality of fuel injectors;
a gaseous fuel supply and pressure control system fluidly connected to the gaseous fuel common rail;
a liquid fuel supply and pressure control system fluidly connected to the liquid fuel common rail;
a surplus gas system that includes an accumulator fluidly positioned between an electronically controlled supply valve and the gaseous fuel supply and pressure control system;
a pressure reduction valve having a first configuration that fluidly connects the gaseous fuel common rail to the surplus gas system, and a second configuration that fluidly blocks the gaseous fuel common rail to the surplus gas system;
each of the fuel injectors having a liquid drain outlet fluidly connected to the liquid fuel supply and pressure control system; and
an electronic controller in control communication with each of the plurality of fuel injectors, the liquid fuel supply and pressure control system, the gaseous fuel supply and pressure control system, the pressure reduction valve and the electronically controlled supply valve.

2. The compression ignition engine of claim 1 wherein the surplus gas system includes an isolation valve fluidly positioned on an opposite side of the accumulator from the electronically controlled supply valve.

3. The compression ignition engine of claim 1 wherein the electronic controller includes a gas venting avoidance algorithm configured to communicate an open signal to the pressure reduction valve responsive to a reduction in desired gas rail pressure.

4. The compression ignition engine of claim 3 wherein the gas venting avoidance algorithm is configured to communicate a close signal to the pressure reduction valve responsive to an engine run signal and a gas rail pressure reduction to the desired gas rail pressure.

5. The compression ignition engine of claim 3 wherein the gas venting avoidance algorithm is configured to communicate a close signal to the pressure reduction valve responsive to an engine shutdown signal and a gas rail pressure approaching equilibrium with an accumulator pressure.

6. The compression ignition engine of claim 1 including a first rail isolation valve fluidly positioned between the gaseous fuel common rail and the gaseous fuel supply and pressure control system; and
a plurality of second rail isolation valves, each fluidly positioned between the gaseous fuel common rail and one of the plurality of fuel injectors.

7. The compression ignition engine of claim 1 wherein the gaseous fuel supply and pressure control system includes a cryogenic tank fluidly connected to a first inlet to the surplus gas system, and a fuel conditioning module fluidly connected to a second inlet to the surplus gas system.

8. A dual fuel common rail system comprising:
a gaseous fuel common rail fluidly connected to a plurality of fuel injectors, a liquid fuel common rail fluidly connected to the plurality of fuel injectors, a gaseous fuel supply and pressure control system fluidly connected to the gaseous fuel common rail, a liquid fuel supply and pressure control system fluidly connected to the liquid fuel common rail, a surplus gas system that includes an accumulator fluidly positioned between an electronically controlled supply valve and the gaseous fuel supply and pressure control system, a pressure reduction valve fluidly positioned between the gaseous fuel common rail and the surplus gas system;
the dual fuel common rail system having a gas pressure reduction configuration in which the pressure reduction valve is open to fluidly connect the gaseous fuel common rail to the surplus gas system to reduce pressure in the gaseous fuel common rail;
the dual fuel common rail system having a gas burn off configuration in which the electronically controlled supply valve is open; and
the dual fuel common rail system having shutdown configuration in which both the pressure reduction valve and the electronically controlled supply valve are closed.

9. The dual fuel common rail system of claim 8 wherein the surplus gas system includes an isolation valve;
the dual fuel common rail system having a normal operation configuration in which the pressure reduction valve is closed; and
the isolation valve is closed when the dual fuel common rail system is in the shutdown configuration.

10. The dual fuel common rail system of claim 8 including a first rail isolation valve fluidly positioned between the gaseous fuel common rail and the gaseous fuel supply and pressure control system;
a plurality of second rail isolation valves, each fluidly positioned between the gaseous fuel common rail and one of the plurality of fuel injectors; and
the first rail isolation valve and the second isolation valves being closed in the shutdown configuration.

11. The dual fuel common rail system of claim 10 wherein the first rail isolation valve and the second isolation valves are open in each of the normal operation configuration and the gas pressure reduction configuration.

12. A machine comprising:
a machine body supported on a conveyance; and
a compression ignition dual fuel engine attached to the machine body and including a gaseous fuel common rail fluidly connected to a plurality of fuel injectors each positioned for direct injection into one engine cylinder; a liquid fuel common rail fluidly connected to the plurality of fuel injectors; a gaseous fuel supply and pressure control system fluidly connected to the gaseous fuel common rail; a liquid fuel supply and pressure control system fluidly connected to the liquid fuel common rail; a surplus gas system that includes an accumulator fluidly positioned between an electronically controlled supply valve and the gaseous fuel supply and pressure control system; a pressure reduction valve having a first configuration that fluidly connects the gaseous fuel common rail to the surplus gas system, and a second configuration that fluidly blocks the gaseous fuel common rail to the surplus gas system; each of the fuel injectors having a liquid drain outlet fluidly connected to the liquid fuel supply and pressure control system; and, an electronic controller in control communication with each of the plurality of fuel injectors, the liquid fuel supply and pressure control system, the gaseous fuel supply and pressure control system, the pressure reduction valve and the electronically controlled supply valve.

13. The machine of claim 12 wherein the gaseous fuel supply and pressure control system includes a cryogenic tank fluidly connected to a first inlet to the surplus gas system, and a fuel conditioning module fluidly connected to a second inlet to the surplus gas system.

14. The machine of claim 13 wherein the surplus gas system includes an isolation valve fluidly positioned on an opposite side of the accumulator from the electronically controlled supply valve.

15. The machine of claim 14 including a first rail isolation valve fluidly positioned between the gaseous fuel common rail and the gaseous fuel supply and pressure control system; and
a plurality of second rail isolation valves, each fluidly positioned between the gaseous fuel common rail and one of the plurality of fuel injectors.

16. A method of operating a dual fuel compression ignition engine that includes a gaseous fuel common rail fluidly connected to a plurality of fuel injectors each positioned for direct injection into one engine cylinder; a liquid fuel common rail fluidly connected to the plurality of fuel injectors; a gaseous fuel supply and pressure control system fluidly connected to the gaseous fuel common rail; a liquid fuel supply and pressure control system fluidly connected to the liquid fuel common rail; an surplus gas system that includes an accumulator fluidly positioned between an electronically controlled supply valve and the gaseous fuel supply and pressure control system; a pressure reduction valve having a first configuration that fluidly connects the gaseous fuel common rail to the surplus gas system, and a second configuration that fluidly blocks the gaseous fuel common rail to the surplus gas system; each of the fuel injectors having a liquid drain outlet fluidly connected to the liquid fuel supply and pressure control system; and, an electronic controller in control communication with each of the plurality of fuel injectors, the liquid fuel supply and pressure control system, the gaseous fuel supply and pressure control system, the pressure reduction valve and the electronically controlled supply valve, the method comprising the steps of:
reducing fueling of gaseous fuel to the engine;
reducing pressure in the gaseous fuel common rail responsive to the step of reducing fueling of gaseous fuel to the engine;
the step of reducing pressure includes opening the pressure reduction valve and moving gaseous fuel from the gaseous fuel common rail to the accumulator of the surplus gas system without venting gaseous fuel to atmosphere; and
closing the pressure reduction valve after the step of reducing pressure.

17. The method of claim 16 wherein the step of reducing fueling is done responsive to an engine over speed condition.

18. The method of claim 16 wherein the step of reducing fueling is done responsive to reducing engine speed.

19. The method of claim 16 wherein the step of reducing fueling is done as part of shutting down the engine.

20. The method of claim 16 including opening the electronically controlled supply valve and combusting a mixture of gaseous fuel from the intake manifold and injected gaseous fuel from the fuel injector by compression igniting diesel fuel from the fuel injector in a plurality of engine cylinders during a first engine cycle;

closing the electronically controlled supply valve and combusting exclusively injected gaseous fuel from the fuel injector by compression igniting diesel fuel from the fuel injector in the plurality of engine cylinders during a second engine cycle.

* * * * *